[11] 3,621,310

| [72] | Inventors | Hisasuke Takeuchi;<br>Ryoichi Sasaki; Humio Hataya; Ryo Hiraga; Eiichi Ishibashi; Takao Koyama, all of Hitachi, Japan |
| --- | --- | --- |
| [21] | Appl. No. | 42,291 |
| [22] | Filed | June 1, 1970 |
| [45] | Patented | Nov. 16, 1971 |
| [73] | Assignee | Hitachi, Ltd.<br>Tokyo, Japan |
| [32] | Priorities | May 30, 1969 |
| [33] | | Japan |
| [31] | | 44/42631;<br>May 31, 1969, Japan, No. 44/42710 |

[54] DUCT FOR MAGNETOHYDRODYNAMIC THERMAL TO ELECTRICAL ENERGY CONVERSION APPARATUS
12 Claims, 1 Drawing Fig.

[52] U.S. Cl............................................. 310/11
[51] Int. Cl.............................................. H02n 4/02
[50] Field of Search................................ 310/11; 313/311

[56] References Cited
UNITED STATES PATENTS
3,274,408  9/1966  Louis.......................... 310/11
3,397,331  8/1968  Burkhard.................... 310/11

*Primary Examiner*—D. X. Sliney
*Attorney*—Craig, Antonelli, Stewart & Hill

ABSTRACT: A duct for magnetohydrodynamic thermal-to-electrical energy conversion apparatus, which is provided with at least a pair of anode electrodes and cathode electrodes, the cathode possessing excellent erosion or corrosion resistance characteristics being made of an alloy consisting of a refractory metal and an adhesive metal, the fine grains of the refractory metal being bonded through the adhesive metal.

1: CATHODE
3: ANODE
5: DUCT
6: INLET
7: OUTLET
9: MAGNETIC COIL
10: COOLING MEANS

PATENTED NOV 16 1971 3,621,310
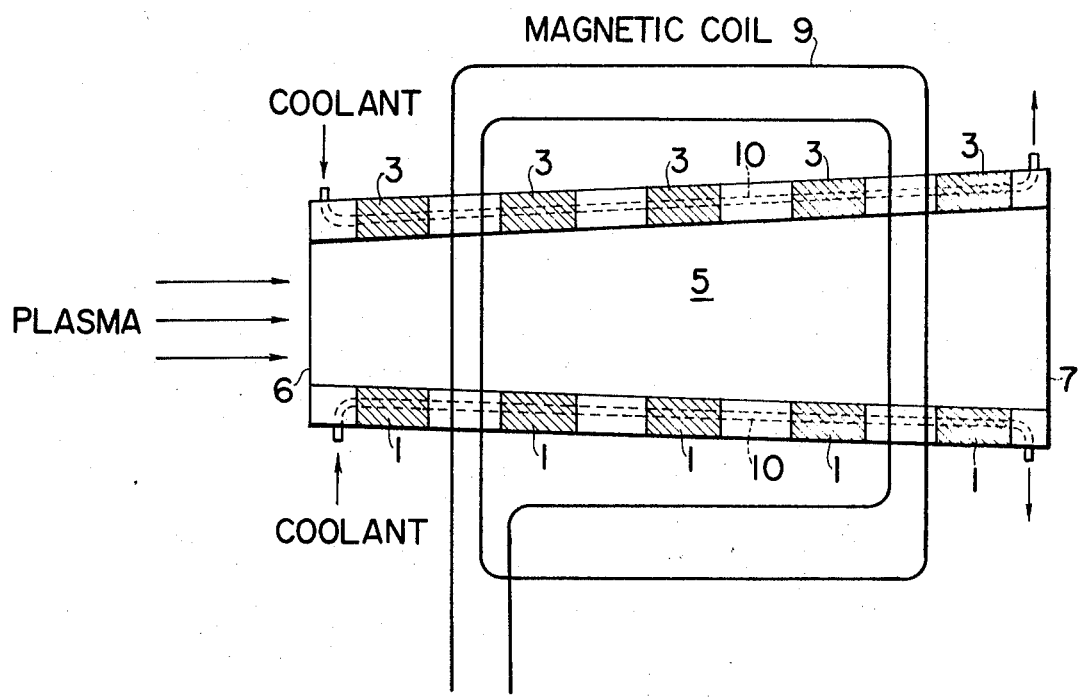
1: CATHODE
3: ANODE
5: DUCT
6: INLET
7: OUTLET
9: MAGNETIC COIL
10: COOLING MEANS
INVENTORS:
HISASUKE TAKEUCHI
RYOICHI SASAKI
HUMIO HATAYA
RYO HIRAGA
EIICHI ISHIBASHI
TAKAO KOYAMA
BY Craig, Antonelli, Stewart & Hill
ATTORNEYS

DUCT FOR MAGNETOHYDRODYNAMIC THERMAL TO ELECTRICAL ENERGY CONVERSION APPARATUS

BACKGROUND OF THE INVENTION

This invention relates to a duct for magnetohydrodynamic generating apparatus having a flow of high-temperature plasma containing electrically conductive combustion gas products therein and provided with at least a pair of anode and cathode electrodes, the cathode being made of an alloy having excellent resistance characteristics to erosion or corrosion due to arc occurrence at the cathode surface. This invention also provides a new combination of the electrodes for the duct.

In general, a duct for a magnetohydrodynamic (MHD) generator comprises a duct wall made of a refractory insulating material, such as ceramics, and at least a pair of anode and cathode electrodes disposed along the duct wall adjacent to the flow of the working fluid or plasma, which is provided at a temperature of 2,000° to 3,000° C. with high speeds and is continuously fed to the duct. Therefore, the duct must be constructed with materials capable of withstanding these high temperatures. However, there is not provided any material capable of withstanding such temperature conditions, therefore, a suitable cooling system for cooling the duct necessarily must be employed. Because the cooling of the duct necessarily causes a decrease in efficiency of generation, it is undesirable to excessively lower the temperature of the duct. According to experiments, it has been found that 1,000° C. and temperatures in the vicinity thereof are suitable for the duct temperature. Therefore, in the duct having a cooling system, the electrodes can be made of metallic material so that conduction of heat and current can be made more effective.

Furthermore, the duct material, especially for the electrodes should have a good resistance to corrosion since a seed substance possessing a strong corrosine property is normally fed to the working fluid so as to improve the electrical conductivity of the fluid.

As stated above, the duct is provided with at least a pair of cathodes for emitting electrons and a pair of anodes maintained at a positive potential with respect to the cathode for receiving the electrons emitted from the cathode. According to experiments, it has been found that the erosion or corrosion rate of the cathode is different from that of the anode when both the electrodes are made of the same material and are subjected to the same operating conditions. That is, in general, the cathode has the larger erosion or corrosion rate, as compared with the anode. This depends upon the difference in the electrical potential between the anode and cathode. In other words, erosion or corrosion of the cathode is mainly caused by arc discharge at the cathode surface.

In the case of the anode, the erosion or corrosion is caused by high temperatures because electrons emitted from the cathode collide against the anode surface. As a result, the anode is made oxidizable at high temperatures. Thus, in summary, erosion or corrosion of the cathode is caused by arc occurrence, but in contrast, in the case of the anode, the erosion or corrosion is caused by oxidation.

Hithertofore, the electrodes have been made of, for example, graphite, ceramics, tungsten, stainless steel, etc. In case of graphite electrodes, they are easily burnt down and vanish only after a few minutes under the operating conditions of operating for a period of 10 hours at a duct temperature of 700° C. And, in cases of stainless steel, silicon carbide and molybdenum disilicide electrodes, corrosion amounts are about 3 mm., about 2 mm. and about 4 mm., respectively, under the same conditions. However, such large corrosion of the electrodes is an important obstacle to long period operation of the MHD generators.

SUMMARY OF THE INVENTION

Accordingly, it is an object of the present invention to provide a duct for MHD generator, which is provided with at least a pair of cathode electrodes possessing good resistance characteristics to corrosion.

It is another object of the present invention to provide a new cathode electrode for the duct of a MHD generator, which possesses excellent arc resistance characteristics.

It is a further object of the present invention to provide a new combination of anode and cathode electrodes for a duct in a MHD generator, which has good resistance characteristics to oxidation and corrosion.

The present invention is based upon the discovery that a cathode electrode made of an alloy consisting of fine grains of a refractory metal and an adhesive metal for bonding the fine grains possesses excellent corrosion resistance characteristics.

To attain the desired effects for the cathode, both the metals selected have considerably small mutual solubility. If this is not so, the advantages of the cathode can hardly be expected.

These and other objects, features and advantages of the present invention will become more apparent from the following detailed description, when taken in conjunction with the accompanying drawing wherein the single FIGURE is a schematic representation of the conversion chamber of a magnetohydrodynamic generator.

DETAILED DESCRIPTION OF THE INVENTION

The drawing schematically illustrates basic components of an MHD generator, and particularly the conversion chamber thereof, wherein a plurality of cathode electrodes 1 and a plurality of anode electrodes 3 are disposed in insulated fashion on opposite sides of a duct 5 having an inlet 6 and an outlet 7 for plasma flowing therethrough. The magnetic coil 9 provides the required field within the duct to produce the conversion of heat into electrical energy. A cooling conduct 10 may be provided in the walls of the duct 5 and the electrodes 1 and 3 to carry coolant therethrough for cooling the anode and cathode electrodes.

Since the present invention does not require a particular MHD generator construction, it should be understood that the conversion chamber schematically illustrated in the drawing is merely provided as an aid to the following description.

As stated heretofore, the cathode emits free electrons being biased by an external magnetic field. This electron emission grows to become an arc discharge. Though the arc occurs in a partial portion of the cathode surface, the temperature at the portion rises to about 4,000° to 5,000° C. Since the arc discharge accompanies vaporization of metallic atoms and the amount of vapor depends upon the temperature of the cathode, the cathode should be cooled sufficiently so as to reduce the corrosion of the cathode.

On the other hand, due to the occurrence of the arc, the surface of the anode is heated by collision of the emitting electrons so that the temperature of the anode also considerably increases. According to experiments, the temperature of the anode surface is about 100° to 300° C. higher than that of the cathode surface. In order to avoid the above disadvantage the duct of the present invention is cooled to lower than about 1,500° C., especially about 1,200° C., so that the surface of the cathode and the anode are respectively maintained at about 500° to 800° C. and 800° to 1,200° C.

In the present invention the cathode is made of an alloy consisting of a refractory metal having a melting point about 500° C. higher than the surface temperature of the cathode and an adhesive metal of a thermal conductivity larger than 0.16 cal/cm. °C. sec. and an electric resistance smaller than $10 \times 10^{-6}$ Ω-cm. In order to attain the desired effects for the cathode, it is important to choose metals having a mutual solubility as small as possible.

The refractory metal mainly contributes to improve the corrosion resistance of the cathode, therefore, it is preferable that the metal has a melting point as high as possible. As tungsten and molybdenum have melting points of about 3,400° C. and 2,620° C., respectively, they are most preferable materials for the refractory metal. Furthermore, these metals have negligibly small solubility to silver and copper which are very useful for the adhesive metal because of their high electrical and thermal conductivities. According to our investigations, it has been found that the adhesive metals which have a specific resistance of smaller than about $10 \times 10^{-6}$ Ω—cm. at 20° C. and a thermal conductivity of larger than about 0.16 cal/cm. °C. sec. at 20° C. are useful.

The electrical and thermal properties and melting points in connection with metals which may be acceptable for the cathode are as follows:

A. Refractory Metal

| | melting point (°C.) | thermal conductivity (cal./cm. °C. sec.) | specific resistance (Ω-cm.) |
|---|---|---|---|
| W | 3,400±50 | 0.382 | $5.4 \times 10^{-6}$ |
| Mo | 2,620 | 0.328 | $5.5 \times 10^{-6}$ |
| Ta | 3,030 | 0.130 | $2 \times 10^{-6}$ |
| Nb | 2,468 | 0.125 | $14.1 \times 10^{-6}$ |

B. Adhesive Metal

| | | | |
|---|---|---|---|
| Ag | 960.5 | 0.998 | $1.62 \times 10^{-6}$ |
| Cu | 1,083 | 0.923 | $1.72 \times 10^{-6}$ |
| Co | 1,490 | 0.165 | $7 \times 10^{-6}$ |
| Ni | 1,455 | 0.20 | $6.9 \times 10^{-6}$ |
| Pt | 1,773 | 0.168 | $10.6 \times 10^{-6}$ |

Though the refractory metals and the adhesive metals are distinguishable from each other by means of their melting points, they must be combined in such relationship that each of the metals shows a negligibly small mutual solubility. If this is not done, not only the electrical and thermal conductivities of the alloy will be deteriorated, but also the melting point of the refractory metal will be lowered, so that the erosion or corrosion resistance characteristics of the cathode will be deteriorated.

Applicable combinations of the above-listed refractory metals and adhesive metals are as follows:

| Refractory Metal | Adhesive Metal |
|---|---|
| W | Ag, Cu, Au |
| Mo | Ag, Cu, Au, Co |
| Ta | Ag, Cu, Au |
| Nb | Ag, Cu, Au, Ni |

It goes without saying that metallic materials to be employed are chosen by taking into consideration the grade of the mutual solubility and the relationship between the melting points of the metals and the electrode temperature. Therefore, a combination of the refractory metal and nickel or cobolt as an adhesive metal is used in the case of a duct being operated at temperatures higher than those of the case of a combination of the refractory metal and silver or copper.

It may be said that the operable temperature of the duct, adhesive metals are sintered in a reducing or hydrogen atmosphere. According to our experiments, it has been found that the cathode made of an alloy thus prepared has excellent arc resistance characteristics, i.e., excellent corrosion resistance characteristics.

In the case where molybdenum or tungsten and silver or copper are combined, it was found that an amount larger than about 20 percent by weight but smaller than about 80 percent by weight of molybdenum or tungsten is preferable. If the amount is larger than 80 percent by weight, thermal and electrical conductivities become extremely small. This result is caused by not only small electrical and thermal conductivities of the refractory metal but an insufficiency of electrical and mechanical connection between the particles of the powder. On the other hand, if the amount is smaller than 20 percent by weight, because of the insufficiency of the thermal resistance of the alloy, the arc resistance of the cathode will not be sufficient when the MHD duct is operated at 700° to 1,200° C.

According to experiment, it has been found that an anode made of high chrome alloys (high Cr content alloy) show good corrosion resistance characteristics. Alloys usable for the anode are, for example, high chrome alloys containing more than 20 percent by weight of chromium. As stated already, since most of the corrosion of the anode is caused by oxidation at high temperatures, the anode is required to have excellent oxidation resistance characteristics. Therefore, the materials mentioned above are preferable for the anode.

For the sake of better understanding the present invention, examples will be disclosed in the following.

Eight kinds of alloys consisting of the compositions set forth in table 1 were prepared. In the case of Ag or Cu-W alloys, tungsten and silver or copper powders of 325 mesh were mixed with each other and then the mixture was molded in a mold having the shape of an anode electrode and a cathode electrode. The molded articles were subjected to sintering in a hydrogen atmosphere at 1,200° C. for one hour. Since the sintering temperature is higher than the melting points of silver and copper, silver and copper powders melt to bond the tungsten powder. The materials thus prepared were installed as an anode electrode and a cathode electrode in an experimental duct.

In case of high chrome alloys, specimens were melted in a vacuum followed by forging and subjected to heat treatment at 1,100° C. for one hour and water cooling. Thus prepared materials were machined to form an anode and cathode.

Testing conditions are as follows:
1. a distance between electrodes   20 cm.,
2. a surface temperature of cathode   500° to 800° C.,
3. a surface temperature of anode   800° to 1,200° C.,
4. fuel   light oil burning with oxygen rich air,
5. seed   potassium hydroxide,
6. external electric field produced by direct current,
7. current density   1.85 A/cm.$_2$, and
8. operating time   for 3 to 10 hours.

TABLE 1
Chemical composition (percent by weight)

| Spec. No. | 1 | 2 | 3 | 4 | 5 | 6 | 7 | 8 |
|---|---|---|---|---|---|---|---|---|
| Anode | 40 Ag–60 W | 30 Cu–70 W | 18 Cr–8 Ni stainless steel. | 18 Cr–8 Ni stainless steel. | 18 Cr–Ni stainless steel. | 0.1 C, 1.26 Si, 0.5 Mn, 25.6 Cr, 1.97 Al, 0.08 Y, Fe bal. | 0.29 C, 0.45 Si, 1 Mn, 26.6 Cr, 46.1 Na, 2.08 Al, Fe bal. | 0.30 C, 1.38 Si, 24.3 Cr, 2.15 Al, 1 Y, Fe. |
| Cathode | 40 Ag–60 W | 30 Cu–70 W | 0.1 C, 1.26 Si, 0.5 Mn, 25.6 Cr, 1.97 Al, 0.08 Y, Fe bal. | 0.29 C, 0.45 Si, 1 Mn, 26.6 Cr, 46.1 Ni, 2.08 Al, Fe bal. | 0.30 C, 1.38 Si, 24.3 Cr, 2.15 Al, 1 Y, Fe bal. | 0.1 C, 1.26 Si, 0.5 Mn, 25.6 Cr, 1.97 Al, 0.08 Y, Fe bal. | 0.29 C, 0.45 Si, 1 Mn, 26.6 Cr, 46.1 Ni, 2.08 Al, Fe bal. | 0.30 C, 1.38 Si, 24.3 Cr, 2.15 Al, 1 Y, Fe bal. | which is determined by the cooling condition and other factors, is dependent upon the melting points of the metals used therefor.

Since any melting method for preparing the alloy to be employed in the present invention may be utilized because they have no solubility and their large difference of melting points, a kind of powder metallurgy may be most useful. That is, it is permissible that a group of the powders of the refractory and TABLE 2
Corrosion rate (mm./hour)

| Spec. No. | 1 | 2 | 3 | 4 | 5 | 6 | 7 | 8 |
|---|---|---|---|---|---|---|---|---|
| Anode | 0.54 | 1.14 | 0.3 | 0.29 | 0.36 | 0.08 | 0.04 | 0.05 |
| Cathode | 0.003 | 0.01 | 0.38 | 0.31 | 0.4 | 0.37 | 0.3 | 0.52 |

From the results shown in table 2, it is seen that cathodes made of Ag-W or Cu-W alloys have excellent corrosion resistance characteristics while anodes made of such alloys do not necessarily have good characteristics. On the other hand, it will also be seen from table 2 that anodes made of high chrome alloys have excellent corrosion resistance characteristics. Therefore, when a cathode made of AG-W or Cu-W alloy is combined with an anode made of high chrome alloy, good results can be expected. According to another experiment in which an anode made of high chrome alloy and a cathode made of 30 Cu-70 W alloy were employed and the operation for the duct was carried out for 6 hours under the same conditions as those of the previous experiment, the corrosion amounts of anode and cathode were 0.20 mm. and 0.002 mm., respectively. That is, the electrodes of the present invention have one tenth or one hundredth of the corrosion amount, as compared with those of conventional stainless steel, silicon carbide and molybdenum disilicide electrodes.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What we claim is:

1. In a magnetohydrodynamic thermal-to-electrical energy conversion apparatus, a duct provided with a working fluid containing conductive gas products, at least a pair of anode and cathode electrodes disposed in the duct adjacent to the fluid and cooling means provided in the duct for cooling the anode and cathode electrodes to temperatures lower than about 1,500° C., the improvement being characterized in that said cathode electrode is made of an alloy consisting of a refractory metal having a melting point of about 300° C. higher than the surface temperature of the cathode and an adhesive metal having a melting point higher than the surface temperature of the cathode, a specific resistance smaller than about $10 \times 10^{-6} \Omega$—cm at 20° C. and a thermal conductivity larger than about 0.16 cal. cm.$^{-1}$sec$^{-1}$deg$^{-1}$ at 20° C., each of the metals having a sufficiently small mutual solubility, whereby the grains of said refractory metal are dispersed in a matrix of said adhesive metal.

2. A duct according to claim 1, in which the alloy comprises a refractory metal selected from the group consisting of tungsten, molybdenum, tantalum, niobium and iron and an adhesive metal selected from the group consisting of silver, copper, cobalt, and nickel.

3. A duct according to claim 2, in which the alloy contains 20 to 80 percent by weight of the refractory metal.

4. A duct according to claim 2, in which each of the metals forming said alloy are selected so that the mutual solubility thereof is negligibly small.

5. A duct according to claim 2, in which the refractory metal is selected from the group consisting of tungsten, molybdenum and a combination thereof and the adhesive metal is selected from the group consisting of silver, copper and a combination thereof.

6. A duct according to claim 1, wherein said refractory metal forming part of said alloy is tungsten and said adhesive metal forming the other part of said alloy is selected from a group consisting of gold, silver and copper.

7. A duct according to claim 1, wherein said refractory metal forming part of said alloy is molybdenum and said adhesive metal forming the other part of said alloy is selected from a group consisting of gold, silver, copper and cobalt.

8. A duct according to claim 1, wherein said refractory metal forming part of said alloy is tantalum and said adhesive metal forming the other part of said alloy is selected from a group consisting of gold, silver and copper.

9. A duct according to claim 1, wherein said refractory metal forming part of said alloy is niobium and said adhesive metal forming the other part of said alloy is selected from a group consisting of gold, silver, copper and nickel.

10. A duct according to claim 1, wherein said anode electrode is made of a chromium alloy containing more than 20 percent by weight of chromium.

11. A duct according to claim 10, wherein the alloy forming said cathode comprises a refractory metal selected from the group consisting of tungsten, molybdenum, tantalum and niobium, and an adhesive metal selected from the group consisting of silver, copper, cobalt and nickel.

12. A duct according to claim 1, wherein said cathode is made of an alloy comprising 60 parts by weight of tungsten and 40 parts by weight of silver, and said cathode is made of a high chromium stainless steel containing more than 20 percent by weight of chromium.

* * * * *